Figure 3:
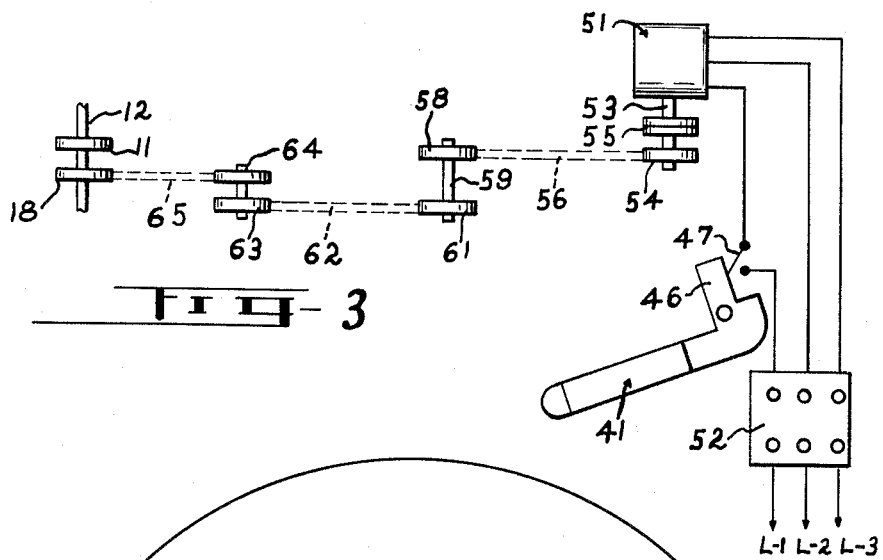

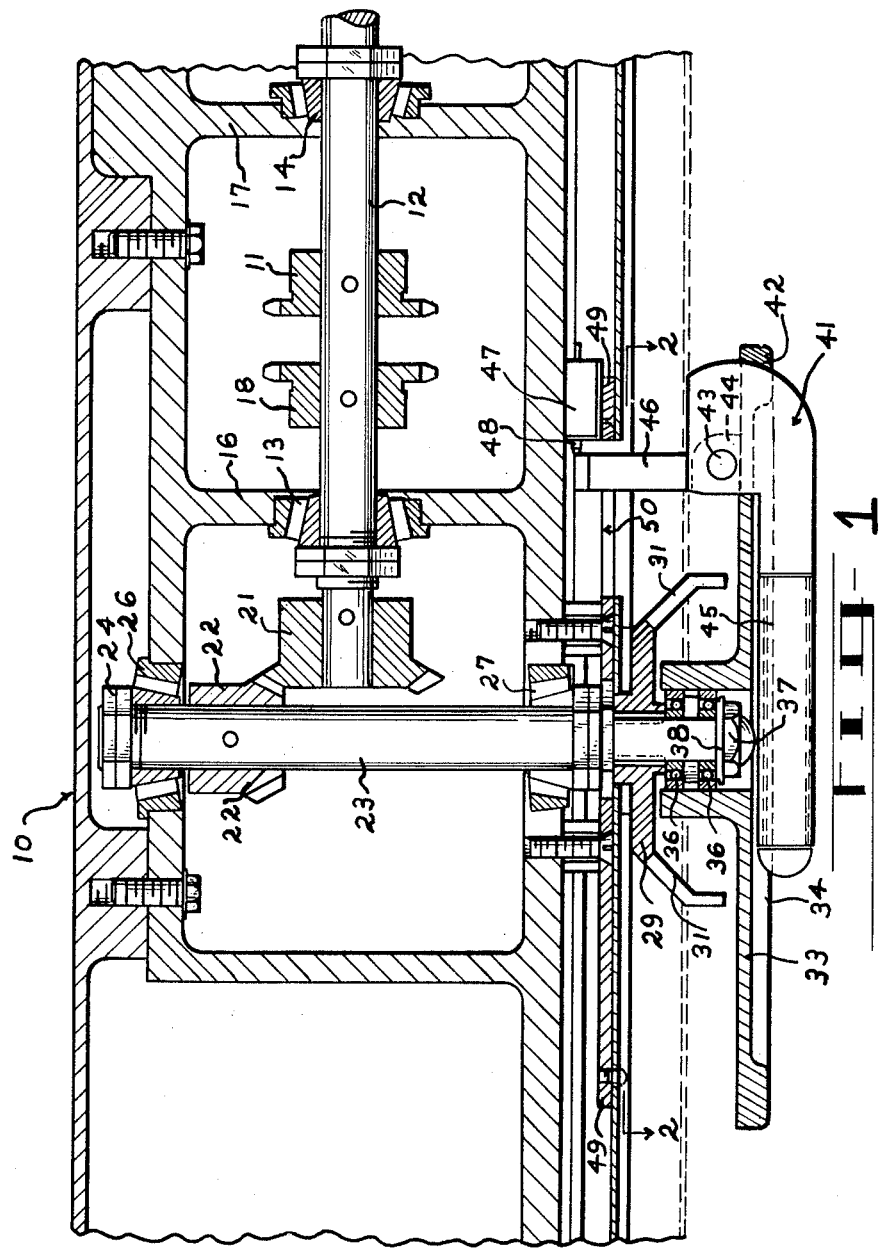

March 9, 1965 H. C. WALK ETAL 3,173,070
SELECTIVE MOTOR OR MANUAL APPARATUS FOR TRANSMITTING POWER
Filed Aug. 29, 1962 2 Sheets-Sheet 2

INVENTOR.
Henry C. Walk
BY William M. Walk, Jr
John W. Montgomery
Jennings, Carter & Thompson
Attorneys

United States Patent Office 3,173,070
Patented Mar. 9, 1965

3,173,070
SELECTIVE MOTOR OR MANUAL APPARATUS
FOR TRANSMITTING POWER
Henry C. Walk, William M. Walk, Jr., and John W. Montgomery, Decatur, Ala., assignors to Decatur Iron & Steel Company, a corporation of Delaware
Filed Aug. 29, 1962, Ser. No. 220,296
3 Claims. (Cl. 318—2)

This invention relates to apparatus for transmitting power and more particularly to such apparatus in which power may be transmitted, selectively, through manual means.

It is an object of the present invention to provide apparatus for selectively transmitting power manually in the event a separate source of power is interrupted, such as occurs in a power failure or the like, with the separate source of power being locked out during operation of the manual power transmitting apparatus.

Another object of the present invention is to provide apparatus for transmitting power manually which shall embody a hub secured adjacent an end of a drive shaft for rotation therewith with a disc mounted on the shaft adjacent the hub and a crank handle mounted on the disc adjacent the outer circumference thereof for rotation therewith and movable between driving and non-driving positions, there being coacting elements on the handle and the hub to connect each other in driving relation only when the handle is in operating position and the disc is rotated thereby to rotate the entire shaft, whereby the shaft is adapted for independent rotation when the handle is in inoperative position.

A further object of this invention is to provide apparatus for transmitting power manually which shall embody a hub having at least one outwardly opening slot therein with a crank handle pivotally mounted on a disc adjacent the outer circumference thereof and movable between a driving position with the handle extending outwardly from the face of the disc and a non-driving position with the handle lying substantially flat against the face of the disc approximately at a right angle relationship to its driving position, there being a lug on the crank handle which fits within the slot of the hub in the driving position of the handle to engage the hub and rotate the shaft upon rotation of the disc through the handle, the lug being out of engagement with the hub in the non-driving position of the handle.

An adfditional feature is the provision of separate power driving means with electrical controls therefor, including a switch, with the crank handle having means thereon operatively connected to the switch and allowing the switch to open in the driving position of the handle while causing the switch to close in a non-driving position of the handle thereby permitting energizing of the separate power driving means only when the crank handle is in non-driving position.

Figure 2:
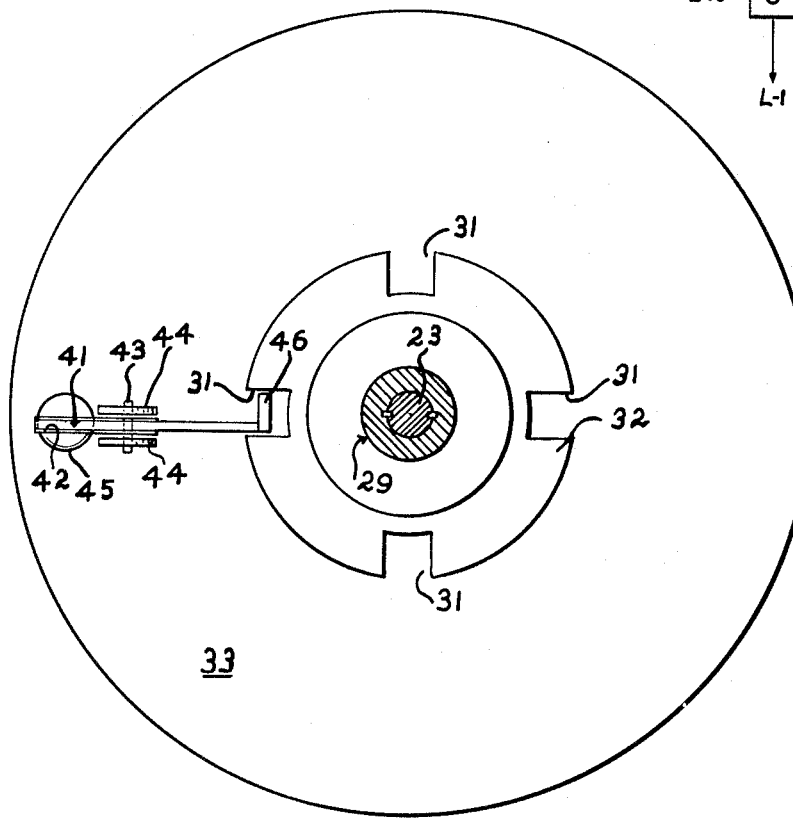

Apparatus embodying features of our invention is shown in the accompanying drawings, forming a part of this application, in which:

FIG. 1 is a sectional view of our invention showing the manual drive means in non-driving position;

FIG. 2 is a sectional view taken generally along the line 2—2 of FIG. 1 but showing the handle in driving position with the longitudinal axis of the handle extending from the face of the disc and carrying means engaging the hub for rotating a drive shaft secured thereto; and, FIG. 3 is a schematic view of separate power driving means operatively connected to a driven element with a normally open switch in series with a source of electrical power for the separate power driving means.

Referring now to the drawings for a better understanding of our invention, we show in FIG. 1 a fragmentary sectional view of a gear box indicated generally by the numeral 10 having a driven shaft 12 mounted for rotation therein. A sprocket 11 is mounted on shaft 12 whereby power is transmitted through shaft 12 and sprocket 11. A specific use for which our apparatus is designed is in the opening and closing of cell doors in jails and the like. Since the specific use of our apparatus does not form a part of our invention, it is not shown in the drawings.

Driven shaft 12 is mounted in bearings 13 and 14 in inner walls 16 and 17 of gear box 10. Sprocket 18 is secured to driven shaft 12 for driving shaft 12 from a separate source of power as will be explained below.

A bevel gear 21 is provided on an end of shaft 12 and meshes with a pinion 22 on a manual drive shaft 23. Drive shaft 23 is mounted in upper and lower bearings 26 and 27, respectively, and axial movement thereof is limited by a nut 24 secured to its upper end. A hub 29 is keyed to shaft 23 for rotation therewith. As shown in FIG. 2, outwardly opening slots 31 are provided in an outwardly extending circumferential portion 32 of hub 29. A disc 33 is mounted on an end of drive shaft 23 and has an inset portion 34 on the outer face thereof. The disc 33 is mounted for rotation on shaft 23 by suitable bearings 36. That is, the inner races of bearings 36 are secured to shaft 23 and rotate therewith while outer races of bearings 36 are secured to disc 33 whereby relative rotation is permitted between disc 33 and shaft 23. A nut 37 is secured to the end of shaft 23 opposite the end thereof carrying nut 24 and a washer 38 is positioned between the nut 37 and the inner race of the adjacent bearing 36.

A handle indicated generally by the numeral 41 extends through a slot 42 adjacent the outer circumference of disc 33 and is pivotally mounted at 43 on projections 44 extending from the inner face of disc 33. A rotatable hand grip 45 is mounted on an end of handle 41. Handle 41 may be moved about pivot 43 through an angle of 90° from a folded non-driving position as shown in FIG. 1 with handle 41 lying in inset portion 34 of disc 33 substantially flat against the inner face of disc 33 to a driving position in which the longitudinal axis of handle 41 extends outwardly from disc 33 as shown in FIG. 2 whereby handle 41 is easily accessible for rotating disc 33. Handle 41 carries a lug 46 on the inner end thereof and as shown in FIG. 2, lug 46 is adapted to fit, selectively, within slots 31 of hub 29 when handle 41 is in extended driving position thereby allowing hub 29 and shaft 23 to be rotated upon rotation of handle 41 and disc 33.

As shown in FIG. 1, a switch 47 having an outwardly urged spring operated plunger 48 thereon is mounted on a plate 49 in position for its plunger to engage the lug 46 while the handle 41 is in the non-driving position. Switch 47 is a normally open switch and when lug 46 does not engage plunger 48, switch 47 is opened. The plate 49 has an opening 50 therethrough for receiving the lug 46. Upon rotation of shaft 23 when handle 41 is in non-driving position as shown in FIG. 1, lug 46 engages the portion of plate 49 defining opening 50 and thereby prevents rotation of disc 33 even through shaft 23 is rotated.

Referring to FIG. 3 in which a separate power driving means is shown, a reversible electric motor is indicated by numeral 51 and electrical energy is supplied through supply lines L–1, L–2, and L–3. A suitable control box 52 allows reversible motor 51 to be reversed as desired along with the stopping and starting of motor 51. Motor shaft 53 has a magnetic clutch 55 thereon along with a sprocket 54 on the end thereof.

Sprocket chain 56 connects sprocket 54 to a sprocket 58 mounted on a jack shaft 59. A sprocket 61 is also mounted on shaft 59 and transmits power through a chain 62 to a sprocket 63 mounted on a countershaft 64. Power is transmitted to sprocket 66 on countershaft 64 through sprocket 18 mounted on power driven shaft 12 and sprocket chain 65.

In operation, driven shaft 12 and sprocket 11 through which the power is to be transmitted is normally driven from motor 51 through the various connections as shown in FIG. 3. With motor 51 driving shaft 12, handle 41 is in folded non-driving position as shown in FIG. 1 and lug 46 closes switch 47 thereby allowing motor 51 to be energized. Shaft 23 rotates when shaft 12 is driven from motor 51 while disc 33 along with handle 41 are restrained from rotation through contact of lug 46 with plate 49.

In the event it is desired to transmit power manually, handle 41 is moved to extended position relative to disc 33 as in FIG. 2. In this position, lug 46 engages a selected slot 31 in hub 29 with switch 47 being opened since lug 46 is not in contact therewith, thereby preventing energizing of motor 51 and magnetic clutch 55 and locking out the separate power driving means for sprocket 11. Upon rotation of handle 41 and disc 33 in the extended position of handle 41, lug 46 through engagement with hub 29 rotates hub 29 and drive shaft 23. Shaft 12 is rotated through the meshing of pinion 22 and bevel gear 21 thereby to drive sprocket 11. Shaft 23 can be rotated in either direction through handle 41 and disc 33.

From the foregoing, it will be understood that we have provided apparatus for selectively transmitting power manually in the event a separate source of power is interrupted, such as occurs in a power failure or the like, with the separate source of power being locked out during the operation of the manual power transmitting apparatus. In some instances, it may be desirable to employ manual power transmitting means even though the separate power driving means is operating effectively. It will be understood that the manual transmitting means may be employed effectively whether or not a separate power driving means is employed and will have uses other than in combination with the separate power transmitting means. The manual means comprises a handle which is movable between a driving position and a non-driving position. Handle 41 locks out the separate power driving means in the driving position thereof by opening a switch which is operatively connected to handle 41.

While we have shown our invention in but one form, it will be obvious to those skilled in the art that it is not so limited, but is susceptible of various changes and modifications without departing from the spirit thereof, and we desire, therefore, that only such limitations shall be placed thereupon as are specifically set forth in the appended claims.

What we claim is:

1. In apparatus for transmitting power selectively by manual means and by a separate source of power,
    (a) a driven element to which power is transmitted selectively,
    (b) a manual driving means adapted to be operatively connected in driving relation to said driven element,
    (c) a separate power driving means adapted to be operatively connected in driving relation to said driven element,
    (d) electrical controls for said separate power driving means including a switch in series therewith,
    (e) said manual means comprising a drive shaft, a hub secured to the drive shaft for rotation therewith, a disc mounted on the shaft adjacent the hub for relative rotation, a crank handle pivotally mounted on the disc adjacent the outer circumference thereof and movable between a driving position with the handle extending outwardly from the face of the disc and a non-driving position with the handle lying substantially flat against the face of the disc approximately at a right angle relation to its driving position, and means carried by said handle to engage the hub for driving in the driving position of the handle and being removed from the hub in the non-driving position of the handle, said last mentioned means being operatively connected to said switch and allowing said switch to open in the driving position of the handle while causing said switch to close in the non-driving position of the handle thereby allowing energizing of said separate power driven means when the handle is in non-driving relation.

2. Apparatus defined in claim 1 in which said hub has at least one outwardly opening slot and said means carried by the handle is a lug adapted to fit in said slot in the driving position of the handle and thereby rotate the hub and drive shaft secured thereto.

3. Apparatus defined in claim 2 in which said lug contacts and closes said switch in the non-driving position of the handle and is removed from contact with said switch in the driving position of the handle thereby allowing said switch to open in such driving position.

References Cited in the file of this patent

UNITED STATES PATENTS

| | | |
|---|---|---|
| 1,133,318 | Rindfleisch | Mar. 30, 1915 |
| 1,477,480 | Groene | Dec. 11, 1923 |
| 2,745,294 | Kran | May 15, 1956 |
| 2,819,628 | Wardlaw | Jan. 14, 1958 |

FOREIGN PATENTS

| | | |
|---|---|---|
| 658,681 | Great Britain | Oct. 10, 1951 |